United States Patent [19]
Bjornsen

[11] 3,908,116
[45] Sept. 23, 1975

[54] DIGITAL DATA FILTER

[75] Inventor: Gary L. Bjornsen, Marion, Iowa

[73] Assignee: Rockwell International Corporation, El Segundo, Calif.

[22] Filed: Aug. 16, 1974

[21] Appl. No.: 497,982

[52] U.S. Cl. ......... 235/152; 235/92 EC; 235/151.32
[51] Int. Cl.² ........................................ G06F 15/20
[58] Field of Search .. 235/152, 177, 151.32, 92 EC; 340/146.1 R; 328/167, 149, 150; 343/5 DP, 8, 9; 318/601, 603

[56] References Cited
UNITED STATES PATENTS

| | | | |
|---|---|---|---|
| 3,196,258 | 7/1965 | Belcastro | 235/92 EC X |
| 3,386,077 | 5/1968 | Molho | 340/146.1 R |
| 3,500,023 | 3/1970 | Arrowood et al. | 235/151.11 X |

Primary Examiner—Malcolm A. Morrison
Assistant Examiner—Jerry Smith
Attorney, Agent, or Firm—Richard W. Anderson; Robert J. Crawford

[57] ABSTRACT

A method and means for processing digital data to permit magnitude changes in a number represented by the data to be utilized to obtain valid rate-of-change (velocity) update signals. The method ignores jumps, repeats etc. caused by jitter on the data which otherwise would preclude using the changes in data weight per unit of time to obtain a velocity-indicative output signal.

7 Claims, 3 Drawing Figures

DIGITAL DATA FILTER

This invention relates generally to rate determining means, and, more particularly, to a means for obtaining a signal indicative of the rate of change of the binary weight of a digital word definitive of an increasing or decreasing displacement.

More specifically, the present invention relates to a digital data filtering system and its application to render valid the determination of rate of change from inconsistently varying digital displacement information.

In the distance measuring equipment (DME) art, wherein the distance to a ground transponder is available in binary form and normally changes in a predictable monotonic manner determined by the closure rate between the airborne interrogater and the ground transponder, rate may be determined by means utilizing the number of times the binary distance information changes in a given period of time. In such systems, if the binary word definitive of the distance measurement changes in a consistent manner, that is a smooth, monotonic manner, the information may be obtained, for example by the generation of a fixed width pulse each time the distance definitive binary word changes in value. That is, the least significant bit of a distance determination available in binary coded decimal form is utilized to generate a fixed-width output pulse each time the least significant bit changes in value. The change occurs in a given system at a rate depending upon the closure rate experienced during the distance measurement, and, in accordance with resolution provided by the particular DME equipment. Assuming consistent (that is consistently increasing or consistently decreasing at a defined rate) distance information, the generation of a fixed-width output pulse in response to each experienced change in the distance information bears a legitimate duty cycle proportionality to the rate of change of the data. Means have been employed in such rate determining systems, for example, to generate such fixed-width pulses in response to successive changes in distance information and to low pass filter this pulse train to obtain a DC analog output signal the magnitude of which is definitive of rate.

The velocity proportional signal generated by the above known method is valid as long as the binary distance information has no jitter on it, that is, it is ever increasing or decreasing in a monotonic manner. If for some reason, however, the distance information does not change in a smooth monotonic manner, the velocity information will be in error. For example, in a particular system wherein derived distance information has 0.1 nautical mile resolution, an example of a correct sequence for distance information would be 0.1, 0.2, 0.3, 0.4, 0.5, etc., as concerns the least significant bit in the binary distance reading. In this example, the distance least-significant bit has moved 0.4 tenths of a mile and the tenth-mile digit changed four times, thus the generation of a fixed-width pulse in response to each of the exampled changes defines a pulse train the duty cycle of which is legitimately proportional to the rate of change in the digital information.

Generally, the experienced least-significant bit readout in a binary distance measurement system does not consistently vary in a smooth monotonic manner, ever increasing or decreasing, due to noise and jitter in the system. While the resulting distance measurement which may be displayed to the pilot may be valid and useful in the presence of jitter, the use of such data in velocity determination results in invalid velocity information. For example a sequence which would generate incorrect velocity information would be 0.1, 0.2, 0.3, 0.2, 0.3, 0.4, 0.5. In this instance the distance has moved again four-tenths of a mile, but the tenth-mile digit changed six times, the second 0.2 and 0.3 tenth mile changes are unwanted and will cause a velocity error.

The unwanted change described above can occur in the distance information and is undesirable as concerns rate determination.

Accordingly, an object of the present invention is to provide a system which receives binary distance or displacement measurement data, effectively filters out the above-defined unwanted changes, and outputs a signal for use in velocity update only when a "valid" distance change occurs.

A further object of the present invention is the provision of a system for processing normally increasing or decreasing binary weighted data in a manner that jitter experienced in the binary data being processed is ineffective in invalidating a velocity definitive output from the processing system.

A still further object of the present invention is the provision of a data processing method and system whereby binary input information may be validly utilized in velocity update determination in the presence of jitter on the input information which would otherwise preclude the obtainment of valid velocity information based on time defined changes in the input information magnitude.

The present invention is featured in the provision of a repeated operational sequence wherein incoming distance definitive data is processed through three levels of storage corresponding respectively to instantly received data, next previously received data, and still next previously received data, and in so comparing the instant data with that in the other storage levels that a velocity update signal is generated only in response to those changes in the level of the input data which define valid distance information changes.

These and other features and objects of the present invention will become apparent upon reading the following description with reference to the accompanying drawings in which.

Figure 1:
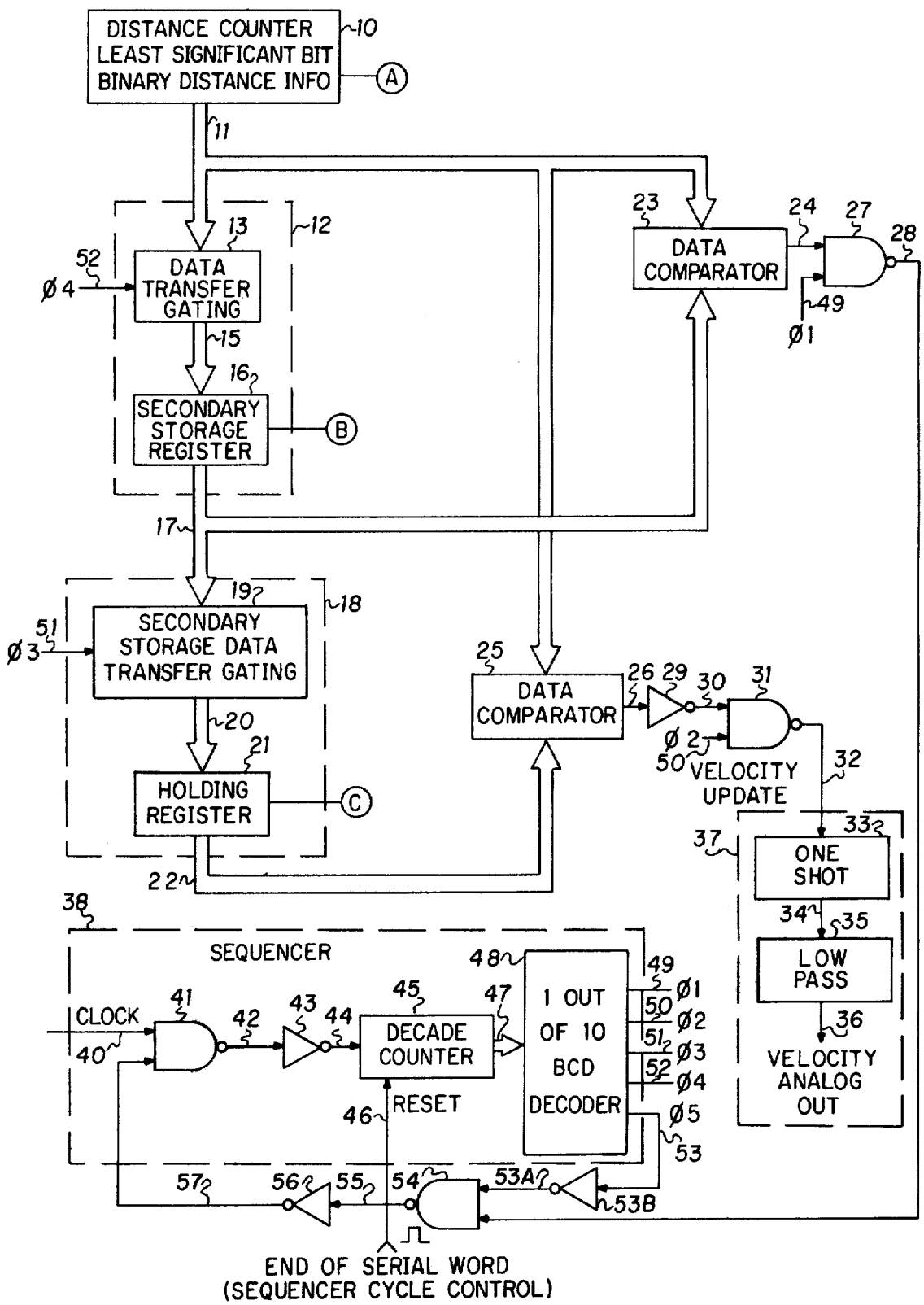
FIG. 1 is a functional block diagram of a digital data filter and its application to determine rate of change of inconsistent digital information in accordance with the present invention.

With reference to FIG. 1, the least-significant bit binary distance information is depicted by a source 10. This source might be in the form of a binary coded decimal four-bit word corresponding to the least-significant bit of distance as digitally determined and displayed by a distance measuring equipment. The data existing in or from source 10, as on output line 11, will hereinafter be defined as the instant received data and this data designated as A. The output 11 from the least-significant bit input information source 10 is selectively transferable through a first data transfer gating means 13 via lines 15 into a secondary storage register 16. This transfer is in response to a gating control input 52, designated $\phi_4$. The data transfer gating means 13, in conjunction with secondary storage register 16 might collectively comprise any commercially available storage register including data transfer input means as designated by functional block 12.

The instantly received data A on lines 11 is additionally applied as a first input to a first data comparator 23 and a second data comparator 25. The second input to data comparator 23 comprises the output 17 of the secondary storage register 16. Output 17 is designated B, and corresponds to the received data in a next previous inputting. The output 17 from the secondary storage register 16 supplied to a further storage register means 18 comprised of a secondary storage data transfer gating means 19 through which the data existing on line 17 is selectively transferable through interconnection 20 as input to a holding register 21. This transfer is effected at the time occurrence of a gating input 51, designated $\phi_3$, to the secondary storage data transfer gating means 19. The output 22 from holding register 21, a data word designated as C, is applied as the second input to data comparator 25.

The output 24 from the first data comparator 23 is applied as an input to a NAND gate 27 along with a further time controlled input pulse 49, designated $\phi_1$. The output 28 from NAND gate 27 is applied as a first input to a further NAND gate 54 along with a further timing input pulse 53, designated $\phi_5$ which is applied through inverter 53B to NAND gate 54. The output 55 from NAND gate 54 is applied through inverter 56 as a first input 57 to a clock gating NAND gate 41 along with a source of clock pulses 40. NAND gate 41 controls the application of clock pulses 42 through inverter 43 as input 44 to a decade counter 45. The decade counter 45 is provided with a reset input pulse 46 and the binary word existing in the decade counter 45 is applied as input 47 to a one-out-of-ten BCD decoder 48 which functions to generate, in response to changing input counts, the successively timed sequence control pulses $\phi_1-\phi_5$.

The clock source 40, the control logic by means of which the clock source 40 is gated to the decade counter 45, and the one-out-of-ten BCD decoder, collectively function as a sequencer 38 to develop, in response to clock inputs to the decade counter 45, time sequential output pulses $\phi_1-\phi_5$. Counter reset 46 is effective in enabling the generation of the time sequential control pulses $\phi_1-\phi_5$ between the time occurrence of successive ones of the reset input pulses. In the system to be defined, the reset input 46 to the decade counter 45 of the sequencer comprises a pulse at the end of a repetitively generated serial word which corresponds to distance readout from the system. For general purposes of the present invention, the counter resetting pulse 46, as it is applied to the sequencer 38, comprises a time repeated control pulse. In response to each such control pulse, the sequencer 38 develops time consecutive sequence pulses $\phi_1-\phi_5$. Thus the reset input 46 to decade counter 45 is utilized for a repetitive cycle control, each cycle in turn defining an operational sequence defined by the time occurrences of pulses $\phi_1-\phi_5$.

The velocity update developed by the system depicted in FIG. 1 is generated by logic means responsive to the output from the second data comparator 25. The output 26 from data comparator 25 is applied through an inverter 29 as a first input 30 to NAND gate 31. The second input to NAND gate 31 comprises sequencer control pulse $\phi_2$. The output 32 from NAND gate 31 comprises a velocity update signal 32 for application to utilization means 37, the latter being illustrated as a one-shot multivibrator 33 developing a constant width pulse 34 in response to each velocity update. The pulses 34 from one-shot multivibrator 33 are applied to a low-pass filtering means 35, the output 36 of which comprises a DC analog validly indicative of the rate of change of the input distance data 10 to the system. It is to be realized that utilization means other than that depicted in FIG. 1 might be responsive to the velocity update 32.

In general operation, each cycle control pulse 46, as it is applied to the decade counter 45 in the sequencer 38, resets counter 45 and allows the counter to count the clock input. Decade counter 45 counts through a 0 – 9 sequence in repeated fashion so long as clock input pulses are applied on input 44 to the counter. The one-out-of-ten BCD decoder 48, in response to predetermined states of counter 45, sequentially develops a five-phase clock output defined by successive time occurrences of sequence control pulses $\phi_1$ on line 49, $\phi_2$ on line 50, $\phi_3$ on line 51, and $\phi_4$ on line 52, and $\phi_5$ on line 53. Sequence control pulse $\phi_1$, as will be described, in response to a particular output from the first data comparator 23, generates a control logic in conjunction with the last one of the sequence control phase 53 ($\phi_5$) to selectively gate the application of clock pulses 40 into the counter 45 of the sequencer 38. Sequence cycle control pulse $\phi_2$ is utilized, in conjunction with a particular output from the second data comparator 25, to selectively provide the velocity update output signal 32. Sequence cycle control pulse $\phi_3$ is utilized to transfer the data in the secondary storage register 16 into the holding register 21, and sequence cycle control pulse $\phi_4$ is utilized to transfer the instant received data into the secondary storage register 16. In response to successive ones of the cycle control pusles 46 (end of serial word) the sequencer 38 is enabled to develop the five-phase clock output $\phi_1-\phi_5$.

At the time of clock $\phi_1$, the data just received, A, and the data in secondary storage register 16, B, are compared in data comparator 23. If data A and data B are the same at the time defined by $\phi_1$, the sequencer is shut off and waits for the end of the next serial word ending (cycle control pulse 46). If the data just received, A, and the data in secondary storage register 16, B, are not the same at the time occurrence of clock $\phi_1$, the data just received, A, and the data in holding register 21, C, are compared during clock phase $\phi_2$ and if these data are different, a velocity update signal is generated. Clock phase $\phi_3$ transfers the data held in secondary storage register 16, B, into holding register 21, while clock phase $\phi_4$ transfers the data just received, A, into secondary storage register 16. Clock phase $\phi_5$ shuts off the sequencer and the cycle starts over again upon the time occurrence of a next subsequent sequencer cycle control pulse 46 which resets decade counter 45.

The repetition rate of the clock source 40 is selected such that in response to each successive one of the sequencer cycle control pulses 46 which reset the counter, the sequencer 38 is allowed time to generate the full five-phase clock sequence. In general, the repetition rate of the sequencer clock control pulses, exampled herein as corresponding to the end of successive serial word readouts of distance in a DME system, occur at a rate considerably faster than the maximum expected rate of change of value of the binary distance input information 10.

Figure 2:
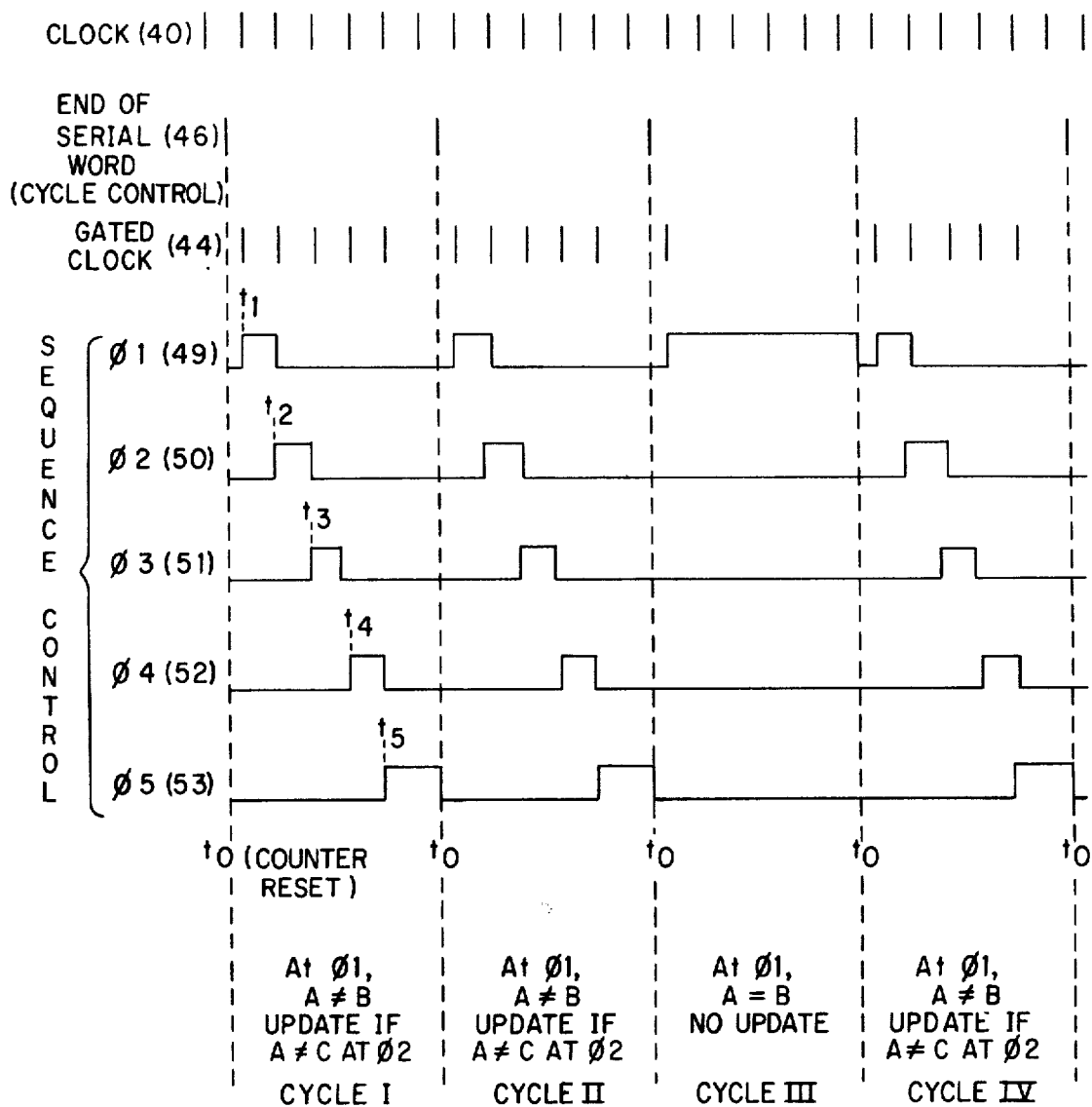
FIG. 2 represents operational wave forms definitive of the filtering sequence which is developed on a repetitive basis in accordance with the present invention.

Reference is made to FIG. 2, wherein the above-defined general timing as to cycle, and sequence within each cycle, is pictorally shown. FIG. 2 illustrates 27 clock pulses 40 occurring at a repetition rate such that at least five clock pulses are generated between successive ones of the cycle control pulse 46 which resets the counter in the sequencer. Clock pulses gated as input 44 to decade counter 45 are depicted, along with the subsequent generation of the five-phase clock $\phi_1-\phi_5$ on respective sequencer output lines 49 – 53. In exampled cycle I, at the time occurrence of clock pulse $\phi_1$, the instantly received data A is assumed not equal to the data B in secondary storage register 16, and the full five-phase clock is generated. This same situation is depicted in the exampled cycle II wherein, at the time occurrence of clock phase $\phi_1$, A is not equal to B. Cycle III depicted in FIG. 2 illustrates the development of clock $\phi_1$, with the assumption that at the time occurrence of $\phi_1$, data A is the same as data B. The exampled cycle IV again assumes that at the time occurrence of phase $\phi_1$, data A is not equal to data B.

As will be further defined by specific example, cycle I of FIG. 2 depicts that a velocity update is generated if data A is not equal to data C at the time occurrence of clock phase $\phi_2$ and, with subsequent generation of clock phases $\phi_3-\phi_5$, data A is transferred into the secondary storage register as data B after data B, then existing in storage register 16, has been transferred into holding register 21 to become data C. This same situation exists in depicted cycle II and in cycle IV.

Cycle III, generates only clock phase $\phi_1$, since there is assumed no change in data from that next previously experienced, and the sequencer stops without subsequent generation of $\phi_2-\phi_5$, since the output from data comparator 23, which compares the instant data with that next previously received provides a logic output which closes the clock gate 41 to stop the counter in this cycle at the number which generates $\phi_1$.

The operation might then generally be described as periodically looking at the instant data and comparing it to that previously received and if these data are the same (indicative of no change in distance) turning off the system sequence with no velocity update being generated in that cycle.

If at clock phase $\phi_1$ the instant data and that previously received are unlike (indicative of a change in distance input) the sequencer is permitted to run full cycle to compare the received data with that received prior to the next previously received data and if these data are unlike generating a velocity update followed by storage data transfers and cycle completion to ready the system for a subsequent cycle of operation.

The detailed manner in which the logic circuitry shown in the implementation of FIG. 1 effects the afore-described operational sequences might now be discussed. With reference to FIG. 1, if data A equals data B, a logic 1 is generated at output 24 of data comparator 23. At the occurrence of clock phase $\phi_1$, this logic 1 on comparator output 24, along with a logic 1 input 49 provided by clock phase $\phi_1$, develops a logic 0 on the output 28 of NAND gate 27. A logic 0 on line 28 provides a logic 1 output from NAND gate 54 which is inverted to a logic 0 level by inverter 56. This logic 0 level on line 57 from inverter 56 forces the output of NAND gate 41 to a logic 1 level regardless of the clock input 40 logic level. This in effect removes the clock pulses from the decade counter 45 by applying a logic 1 level from clock NAND gate 41 on line 42, which is inverted to a logic 0 by inverter 43 and applied to the clock input of decade counter 45 via line 44. This holds the counter $\phi_1$ and prevents sequence cycle control pulses $\phi_2-\phi_5$ from being generated. In this instance the sequencer 38 waits to be enabled by the generation of a subsequent cycle control pulse on reset input line 46.

If at the time occurrence of sequence control pulse $\phi_1$, data A is not equal to data B the output from NAND gate 27, in response to the output from data comparator 23, is a logic 1. This logic 1 level on line 28, in conjunction with a then 1 logic level provided by clock phase $\phi_5$, via inverter gate 53A generates a logic 1 level into the clock NAND gate 41 so that the clock continues to be applied to the counter, and clock phase $\phi_2$ is generated at the time $t_2$ depicted in FIG. 2.

Now at clock phase $\phi_2$, if data A equals data C, data comparator 25 provides a logic 1 output on line 26 which is inverted to a logic 0 on input 30 to NAND gate 31. The logic 0 input on line 30, along with a logic 1 level provided by clock $\phi_2$, provide no output from NAND gate 31 (and thus no velocity update). If, however, at the time occurrence of clock phase $\phi_2$, data A is not equal to data C, data comparator 25 provides a logic 0 output on line 26 which is inverted to a logic 1 on input 30 to NAND gate 31. This logic 1 input on line 30, together with a logic 1 input exhibited by $\phi_2$ on line 50, provides a logic 0 output from NAND gate 31 for the duration of $\phi_2$, and a velocity update is provided by gate 31.

The manner in which the aforedefined comparisons in logic circuitry enable a jittering input digital data information to provide valid velocity update information might best be comprehended from consideration of a specific exampled run of data which exhibits jitter, and the manner in which velocity updates are provided only for valid changes in this input data.

Figure 3:
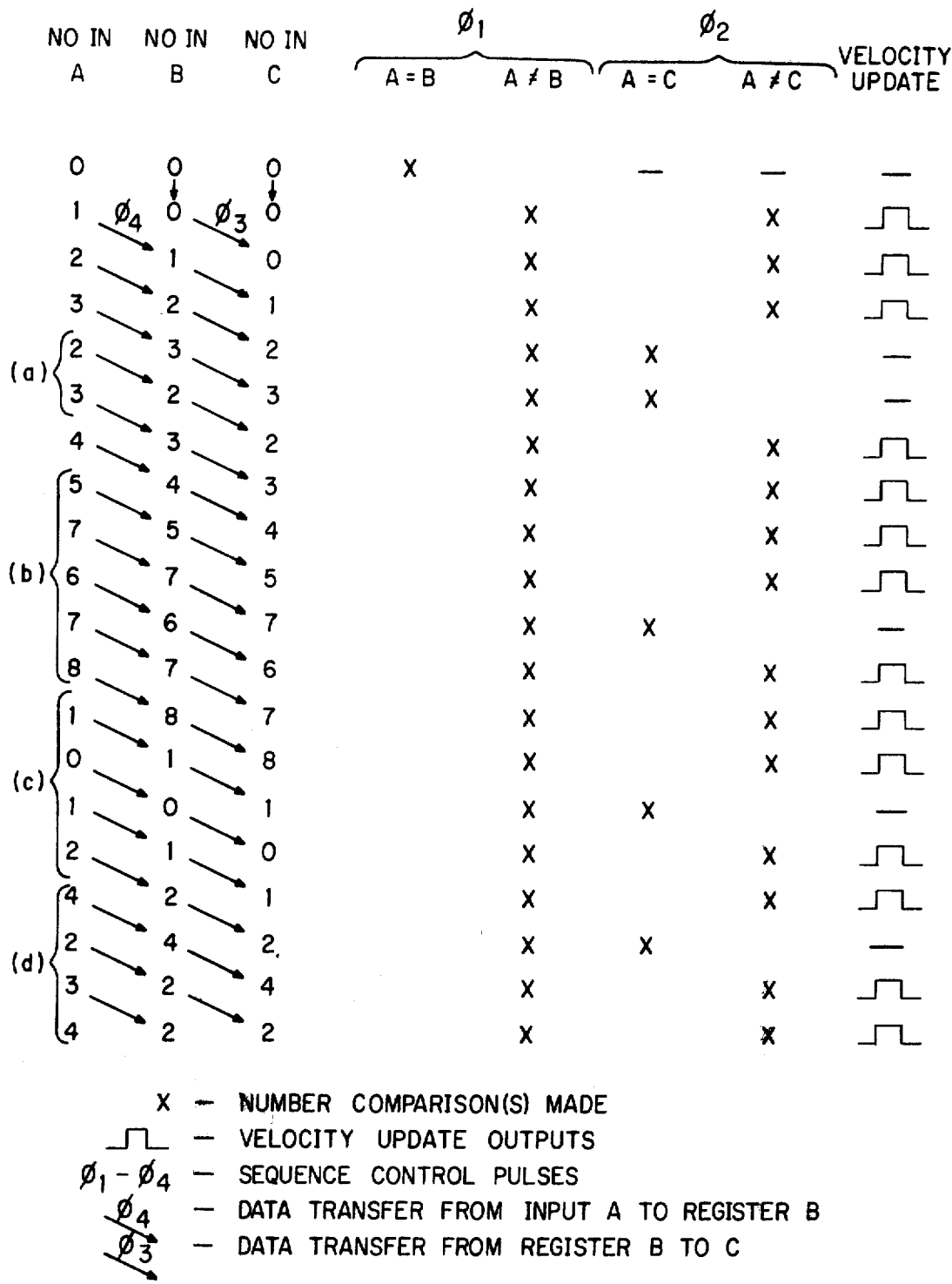
FIG. 3 is a diagrammatic representation of successive operational sequences of the system of FIG. 1 in response to an exampled run of changing input digital information.

With reference to FIG. 3, a tabular sequence is depicted concerning a changing input distance definitive data word. The table depicts the number defined by the data on input line 10 along with the numbers existing in the secondary storage register 16 and holding register 21 during repeated operational sequences. The number corresponding to the value of instant input data A is seen not to change in a consistent monotonic manner. An unwanted transition (a) is depicted in the instant data A, a jump from 5 to 7 exhibited during the sequence (b), jitter is exhibited at (c) as well as (d). Clock phases $\phi_1-\phi_4$ are functionally depicted in the tabular data of FIG. 3 with the understanding that clock phase $\phi_5$ is instrumental in resetting the system for a repeated sequence during each cycle wherein unlike A and B comparisons are made.

Assuming, at turn-on, that the number zero is instantly received and is the number stored in each of the levels of storage of the system, at clock phase $\phi_1$ data A equals data B and the sequence is shut down to await the next cycle control pulse. A subsequent change in instantly received data A from zero to one results in data A not equaling data B at clock phase $\phi_1$ followed by a determination that data A is not equal to data C at clock phase $\phi_2$ and a velocity update is generated. The table depicts, at times $\phi_3$ and $\phi_4$ the respective transfers of data B to become data C and data A to become data B for the next sequence. When the incoming data A changes from one to two, data A is not equal to data B at time $\phi_1$, and not equal to data C at time $\phi_2$, and thus a further velocity update is generated. It may be seen that the unwanted transition during the sequence (a) results in no velocity update being generated. It might further be noticed that the jump in input data from five to seven during sequence (b) is corrected for as concerns velocity update. In general, the sequence indicates that, over a period of time, invalid transitions and jitter occurring in the instantly received data are ignored as concerns velocity update, and the velocity update tends toward validity, whereas a system developing a velocity update in response to any change in input data would produce an invalid velocity determination.

While there are limitations as to the extent to which the filter system of the present invention validates certain unwanted input data changes, the system in general operates effectively to produce valid velocity update output signals in the presence of changing input data otherwise unusable for such a velocity determination. The filter is not effective, for example, if the number in the input data jumps three or more counts, nor is it effective if the number in the input jumps two counts and returns and does not jump subsequently. The filter is further ineffective if the number in the input jumps counts continuously. For the average application, it has been found, however, that fairly consistently-valid changing input data as obtained from a DME system, may provide extremely valid velocity updates when processed by the filter of the present invention.

The present invention is thus seen to provide a means for processing digital data definitive of a changing distance such that in the presence of jitter and other unwanted data value transitions, a velocity update signal may be validly generated by ignoring unwanted transitions which otherwise would completely invalidate the velocity update output signal.

Although the present invention has been described with respect to a particular embodiment thereof, it is not to be so limited as changes might be made therein which fall within the scope of the invention as defined in the appended claims.

I claim:

1. In a system for development of a signal indicative of the rate of change of periodically updated, normally monotonically changing, digital data by providing a rate of change update signal in response to successive changes in binary weight of input digital data; a method of digitally filtering said digital data to validate rate of change update signals in the presence of jitter in said digital data, comprising repeated operational cycles, each said operational cycle comprising the sequential steps of:

1. comparing the instant digital input data with the next previously inputted digital data and providing no rate of change update signal when these data are the same, while readying the sequence for a repeated like comparison of data in response to the next successive input of said digital data,
2. comparing the instant digital data with that which preceded said next previously inputted digital data when the comparison of Step (1) indicates unlike data being compared, and
3. developing a rate-of-change update output signal only when the comparison of Step (2) indicates unlike data being compared.

2. The method of claim 1 wherein said instant data comprises the least significant digit of the binary output of a distance measuring means, and wherein said sequential steps defining each said operational cycle are effected in response to individual successive ones of the output of a multiphase clock controlled sequencer.

3. The method of claim 2 wherein the repetition rate of said operational cycle defines plural operational cycles between expected successive monotonical changes in said instant data.

4. In a system for development of a signal proportional to the rate of change of periodically updated, normally monotonically changing, digital data by providing a rate of change update signal in response to successive changes in binary weight of input digital data, a method of digitally filtering said digital data to validate rate of change update signals in the presence of jitter in said digital data, comprising repeated operational cycles, each said operational cycle comprising the sequential steps of:

1. storing the data received during a next preceding operational cycle in a first storage register,
2. storing the data received during a still further preceding operational cycle in a second storage register,
3. comparing the instant digital data with that stored in said first storage register and providing no rate of change update signal when these data are the same while readying the system for a succeeding comparison of next inputted digital data with that stored in said first storage register,
4. comparing, only when the comparison of Step (3) indicates unlike data, the instant digital data with that stored in said second storage register,
5. developing, only in response to different data being compared in Step (4), a rate of change of input data update signal,
6. transferring the data in said first storage register to said second storage register,
7. transferring the instant data into said first storage register, and
8. readying the system for a repeat sequence as defined in steps (1)-(7), above.

5. In a rate determining system wherein a velocity update output signal is generated in response to successive predictably changing magnitude-indicative input data, a digital data filtering means by means of which input digital data changes other than predictable monotonical changes are precluded from effecting generation of said velocity update output signal, comprising:

a source of cycle control pulses with repetition rate exceeding that of nominally expected changes in said input data;

a clock controlled sequencer means responsive to each of said cycle control pulses to generate a plurality of time sequential sequence-control pulses within the time frame between successive ones of said cycle control pulses;

a first storage register;

a second storage register;

a first data comparator;

a second data comparator;

said input data and that stored in said first storage register being applied as respective inputs to said first data comparator;

said input data and that stored in said second storage register being applied as respective inputs to said second data comparator;

first data transferring means for selectively transferring said input data into said first storage register;

second data transferring means for selectively transferring the data in said first storage register into said second storage register;

first logic means responsive to the output of said first data comparator and a first one of said sequence control pulses to preclude generation of subsequent ones of said sequence control pulses when said comparator output is indicative of like data inputs thereto;

said first logic means being responsive to unlike data inputs to said first comparator at the time occurrence of said first sequence control pulse to enable said sequencer means to generate successive ones of said plurality of sequence-control pulses;

further logic means responsive only to unlike data inputs to said second comparator at the time occurrence of a second one of said sequence-control pulses to generate a velocity update output signal;

means enabling said second data transferring means at the time occurrence of a third one of said sequence-control pulses;

means enabling said first data transferring means at the time occurrence of a fourth one of said sequence-control pulses; and means for disabling said sequencer means at the time occurrence of a fifth and last one of said sequence-control pulses.

6. The system of claim 5 wherein said sequencer means comprises a source of clock pulses, a counter, gating means responsive to said first logic means through which said clock pulses are selectively gated to said counter, logic decoding means receiving the output of said counter and generating said sequence control pulses in response to successively higher predetermined counts in said counter being effected, and said last one of said sequence-control pulses being applied as a zero reset input to said counter.

7. The system of claim 6 wherein said input data comprises the least significant bit of a binary word definitive of a distance measurement, said bit exhibiting a nominal monotonic change in binary weight, and said cycle control pulses having a repetition rate sufficiently high that a plurality thereof are inputted to said counter between time occurrences of nominal changes in binary weight of said input data.

* * * * *